US009412294B2

(12) United States Patent
Li et al.

(10) Patent No.: US 9,412,294 B2
(45) Date of Patent: Aug. 9, 2016

(54) DATA TRANSMISSION DEVICE, DATA TRANSMISSION METHOD AND DISPLAY DEVICE

(71) Applicant: BOE Technology Group Co., Ltd., Beijing (CN)

(72) Inventors: Shou Li, Beijing (CN); Jiyang Shao, Beijing (CN); Tianyue Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 117 days.

(21) Appl. No.: 14/361,878

(22) PCT Filed: Dec. 16, 2013

(86) PCT No.: PCT/CN2013/089521
§ 371 (c)(1),
(2) Date: May 30, 2014

(87) PCT Pub. No.: WO2015/024342
PCT Pub. Date: Feb. 26, 2015

(65) Prior Publication Data

US 2015/0054723 A1 Feb. 26, 2015

(30) Foreign Application Priority Data

Aug. 22, 2013 (CN) .......................... 2013 1 0370373

(51) Int. Cl.
*H04L 7/00* (2006.01)
*G09G 3/20* (2006.01)
(Continued)

(52) U.S. Cl.
CPC .............. *G09G 3/2096* (2013.01); *G09G 5/006* (2013.01); *G09G 5/12* (2013.01); *G09G 2370/14* (2013.01)

(58) Field of Classification Search
CPC ..................... H04L 25/03343; H04L 25/4927; H04L 25/4975; H03M 13/25; H04B 14/04
USPC .................. 375/229–238, 242–254, 354–377
See application file for complete search history.

(56) References Cited

U.S. PATENT DOCUMENTS 4,706,260 A * 11/1987 Fedele .................. H03M 3/042 375/240.05
4,951,139 A * 8/1990 Hamilton ................. H04N 7/12 348/E7.045

(Continued)

FOREIGN PATENT DOCUMENTS

CN 101276642 A 10/2008
CN 101739997 A 6/2010

(Continued)

OTHER PUBLICATIONS

"V-by-One HS Standard Version 1.4", Abridged Edition, Thine Electronics, Inc., 2011, pp. 1-57.

(Continued)

*Primary Examiner* — James M Perez
(74) *Attorney, Agent, or Firm* — Frommer Lawrence & Haug LLP

(57) ABSTRACT

The present invention relates to a data transmission device, a data transmission method, and a display device using the data transmission device. The data transmission device comprises a multichannel V-By-One interface module, which comprises a receiving end, a transmitting end, and a buffer module arranged between the receiving end and the transmitting end. The receiving end transmits a plurality of control signals for a plurality of channels to the buffer module. The buffer module transmits one low-level control signal to the transmitting end when all the received control signals are at a low level. After receiving the one low-level control signal, the transmitting end simultaneously transmits output data corresponding to the respective channels, realizing time synchronization of all the output data, thus avoiding abnormal display of images, enhancing display quality of the images, and finally achieving the effect of optimizing and improving user experience.

15 Claims, 5 Drawing Sheets

(51) Int. Cl.
*G09G 5/00* (2006.01)
*G09G 5/12* (2006.01)

(56) References Cited

U.S. PATENT DOCUMENTS 4,964,141 A * 10/1990 Matsushima ......... H04L 7/0008 375/257
5,367,545 A * 11/1994 Yamashita .............. H04J 3/076 375/372
5,471,510 A * 11/1995 Renault ................. H04J 3/0632 370/517
5,654,698 A * 8/1997 Snelgrove .............. G08C 15/12 340/12.17
6,154,772 A * 11/2000 Dunn .................. H04M 11/062 725/109
6,990,143 B2 * 1/2006 Lin ....................... H03L 7/0812 370/347
7,224,737 B2 * 5/2007 Voutilainen ............... H04L 7/06 332/115
7,254,157 B1 * 8/2007 Crotty ...................... H03K 3/84 331/57
8,098,781 B1 * 1/2012 Furman ............. H04L 25/03038 327/551
8,212,587 B2 * 7/2012 Yeung ...................... H04B 3/36 326/82
8,564,365 B2 * 10/2013 Dang ....................... H03K 9/08 329/312
9,135,875 B2 * 9/2015 Zhang .................. G09G 3/3685
2003/0067456 A1 * 4/2003 Low ....................... G09G 5/005 345/204
2004/0160833 A1 * 8/2004 Suzuki ................. G11C 7/1051 365/194
2004/0264613 A1 * 12/2004 Buchmann ............ H04L 7/0337 375/354
2007/0242742 A1 * 10/2007 Biman ................... G09G 5/006 375/233
2008/0285372 A1 * 11/2008 Sohn .................... G11C 7/1075 365/230.05
2010/0027712 A1 * 2/2010 Poulton ............... H04L 25/0272 375/295
2010/0118932 A1 * 5/2010 Luo ...................... G09G 3/2096 375/240.01
2010/0164967 A1 * 7/2010 Lee ........................ G09G 5/008 345/522
2010/0277494 A1 * 11/2010 Cho ..................... G09G 3/3614 345/589
2011/0134092 A1 * 6/2011 Lee ...................... G09G 3/3614 345/209
2011/0169800 A1 * 7/2011 Jun ...................... G09G 3/3644 345/211
2012/0087405 A1 * 4/2012 Cheung ............. H04L 25/03885 375/232
2013/0050176 A1 * 2/2013 Kim ......................... G09G 3/36 345/214
2013/0285739 A1 * 10/2013 Blaquiere ...... G01R 31/318555 327/565
2014/0035955 A1 * 2/2014 Wang ..................... G09G 5/005 345/660
2014/0078028 A1 * 3/2014 Qing .................... G09G 3/3233 345/77
2014/0226708 A1 * 8/2014 Yang ........................ H03K 7/08 375/238
2015/0229467 A1 * 8/2015 Lee ......................... H04L 25/14 375/371
2015/0311950 A1 * 10/2015 Cheung ............. H04L 25/03885 375/232
2015/0381219 A1 * 12/2015 Kramer ................ H04B 1/0475 375/297
2016/0065395 A1 * 3/2016 Song ........................ H04B 1/04 375/232
2016/0142199 A1 * 5/2016 Lee ......................... H04L 25/14 375/371

FOREIGN PATENT DOCUMENTS

| | | | |
|---|---|---|---|
| CN | 102065254 | A | 5/2011 |
| CN | 103050073 | A | 4/2013 |
| CN | 103198807 | A | 7/2013 |
| CN | 103413516 | A | 11/2013 |
| JP | 2004-523056 | A | 11/2002 |
| TW | 200305081 | A | 10/2003 |
| WO | WO 02/089141 | A | 11/2002 |

OTHER PUBLICATIONS

Notification of the First Office Action from Chinese Patent Office for priority application CN 201310370373.3 issued Jun. 10, 2015 with English translation.

Written Opinion of the International Searching Authority (SIPO) for international application PCT/CN2013/089521 dated May 15, 2014.

* cited by examiner

DATA TRANSMISSION DEVICE, DATA TRANSMISSION METHOD AND DISPLAY DEVICE

This application is a 371 of PCT/CN2013/089521 filed on Dec. 16, 2013, which claims priority benefits from Chinese Patent Application Number 201310370373.3 filed Aug. 22, 2013, the disclosure of which is incorporated herein by reference.

FIELD OF THE INVENTION

The present invention relates to the field of display technology, and particularly to a data transmission device, a data transmission method and a display device using the data transmission device.

BACKGROUND OF THE INVENTION

According to the prior art, signal transmission of display devices such as a Liquid Crystal Display (LCD) is usually implemented in a low-voltage differential signaling (LVDS) transmission mode, which is a digital interface standard developed specially for image transmission, and LVDS is adopted for signal input and output levels.

V-By-One interface technology, as an interface technology capable of transmitting data at a high speed, emerges with the development of the low-voltage differential signaling transmission technology. A multichannel V-By-One interface module mainly comprises a receiving end RX and a transmitting end TX. The receiving end RX and the transmitting end TX in the multichannel V-By-One module constitute a communication network through a control signal Lockn, a hot plug detect signal HTPDN and a plurality of pairs of data signals (each of a plurality of channels corresponds to one pair of data lines among the plurality of pairs of data lines).

In the prior art, a most basic multichannel V-By-One interface unit is a four-channel V-By-One interface unit, which comprises a control signal Lockn, a hot plug detect signal HTPDN, and data signals for four channels (i.e. the four channels respectively correspond to four pairs of data signals). An eight-channel or sixteen-channel V-By-One interface module is formed by connecting a plurality of four-channel V-By-One interface units in parallel.

When a multichannel V-By-One interface module performs data transmission, for each channel or each group of multiple channels (such as a group of four channels in a four-channel V-By-One interface unit), one control signal Lockn may be provided to control the timing(s) of the channel (or the group of channels), so as to transmit different data within different time periods. That is to say, a plurality of control signals Lockn are provided for a plurality of channels, which brings a problem of instability in signal transmission unfortunately. FIG. 1 shows a basic control timing diagram and output waveforms. It can be found that since a control signal Lockn 1 and a control signal Lockn (N+1) may be out of sync with each other (e.g. the control signal Lockn 1 and the control signal Lockn (N+1), which are out of sync with each other, are shown in FIG. 1), the phenomenon of unsynchronized data of the same image after transmission will occur (for example, there is a delay ΔT between the output waveforms corresponding to the control signal Lockn (N+1) and the control signal Lockn N shown in FIG. 1, respectively).

SUMMARY OF THE INVENTION

(I) Technical Problem to be Solved

The object of the present invention is to provide a data transmission device comprising a multichannel V-By-One interface module, so as to solve the problem of abnormal display of a image resulting from non-synchronization of data of the same image after transmission due to non-synchronization of control signals Lockn in the prior art. In addition, the present invention also provides a data transmission method implemented by the data transmission device, and a display device comprising the data transmission device.

(II) Technical Solution

According to an aspect of the present invention, there is provided a data transmission device comprising a multichannel V-By-One interface module, the multichannel V-By-One interface module comprising a receiving end, a transmitting end, and a buffer module arranged between the receiving end and the transmitting end. The receiving end transmits a plurality of control signals for a plurality of channels to the buffer module. The buffer module transmits one low-level control signal to the transmitting end when the received plurality of control signals are all at a low level. The transmitting end starts transmitting data after receiving the one low-level control signal.

Preferably, the multichannel V-By-One interface module may comprise a plurality of multichannel V-By-One interface units in parallel, each of which comprises a receiving end and a transmitting end, the receiving ends of the multichannel V-By-One interface units constitute the receiving end of the multichannel V-By-One interface module, and the transmitting ends of the multichannel V-By-One interface units constitute the transmitting end of the multichannel V-By-One interface module.

Preferably, the buffer module may comprise one buffer unit.

Alternatively, the buffer module may comprise a plurality of buffer unit stages, and the number of buffer units in each buffer unit stage decreases progressively. The buffer stages in the first buffer unit stage are connected with the receiving end of the multichannel V-By-One interface module, and there is one buffer unit in the last buffer unit stage, which is connected with the transmitting end of the multichannel V-By-One interface module. One or more buffer units in each buffer unit stage each transmit one low-level control signal to a buffer unit in the next buffer unit stage or to the transmitting end of the multichannel V-By-One interface module when all the control signals received by the buffer unit of the buffer unit stage are at a low level.

In the case where the buffer module comprises a plurality of buffer unit stages, the plurality of buffer unit stages may be two buffer unit stages. The buffer units in the first buffer unit stage are connected with the receiving end of the multichannel V-By-One interface module, and there is one buffer unit in the second buffer unit stage, which is connected with the transmitting end of the multichannel V-By-One interface module. The buffer units in the first buffer unit stage each transmit one low-level control signal to the one buffer unit in the second buffer unit stage respectively when all the control signals received by the buffer unit in the first buffer unit stage are at a low level, and the one buffer unit in the second buffer unit stage transmits one low-level control signal to the transmitting end of the multichannel V-By-One interface module when all the control signals received by the one buffer unit in the second buffer unit stage are at a low level.

Preferably, the buffer unit may comprise an OR-gate circuit.

Preferably, the multichannel V-By-One interface units may be four-channel V-By-One interface units, and the receiving end of the multichannel V-By-One interface module transmits one control signal for four channels of each four-channel V-By-One interface unit.

According to another aspect of the present invention, there is provided a data transmission method based on a multichannel V-By-One interface module, the multichannel V-By-One interface module comprising a receiving end, a transmitting end, and a buffer module arranged between the receiving end and the transmitting end, the method comprising the steps of: transmitting a plurality of control signals for a plurality of channels to the buffer module by the receiving end; transmitting one low-level control signal to the transmitting end by the buffer module when the received plurality of control signals are all at a low level; and starting transmitting data by the transmitting end after receiving the one low-level control signal.

According to yet another aspect of the present invention, there is provided a display device comprising the above-mentioned data transmission device.

(iii) Beneficial Effects

According to the data transmission device provided by the present invention, by providing the buffer module between the receiving end and the transmitting end of the multichannel V-By-One interface module, one low-level control signal is transmitted to the transmitting end by the buffer module when all the control signals for the channels transmitted from the receiving end to the buffer module are at a low level; and output data corresponding to the channels are transmitted simultaneously by the transmitting end when the transmitting end receives the one low-level control signal, and in this manner, time synchronization of all output data is achieved, abnormal display of images is avoided, display quality of the images is enhanced, and finally the effect of optimizing and improving user experience is achieved.

DETAILED DESCRIPTION OF THE EMBODIMENTS

Specific implementations of the present invention are further described below in conjunction with the accompanying drawings and the embodiments. The embodiments below are used for illustrating the present invention, instead of limiting the scope of the present invention.

Figure 1:
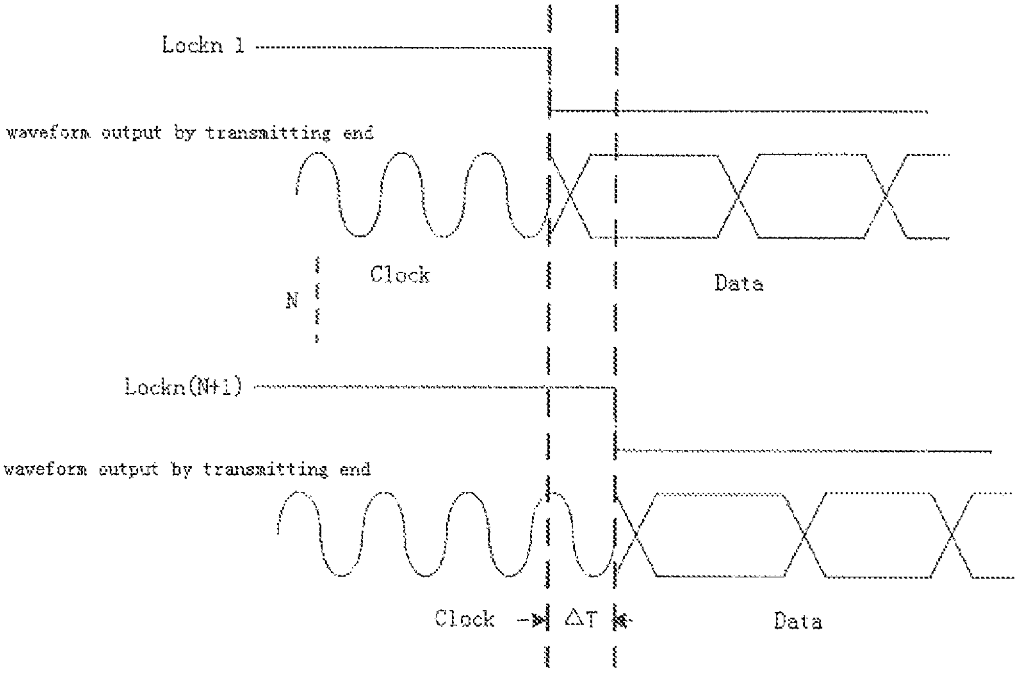
FIG. 1 is a schematic diagram illustrating control timing and output waveforms of a data transmission device in the prior art.
Figure 2:
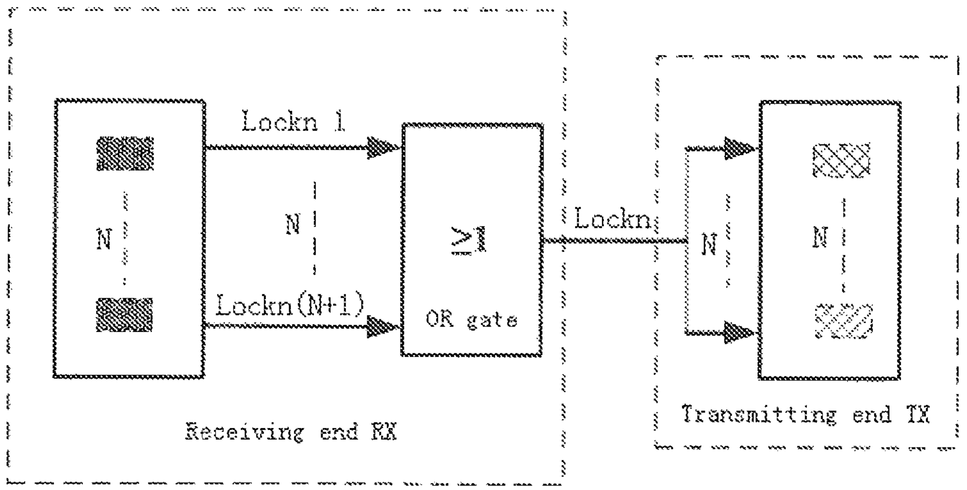
FIG. 2 is a module diagram of a data transmission device comprising a multichannel V-By-One interface module according to one embodiment of the present invention.
Figure 3:
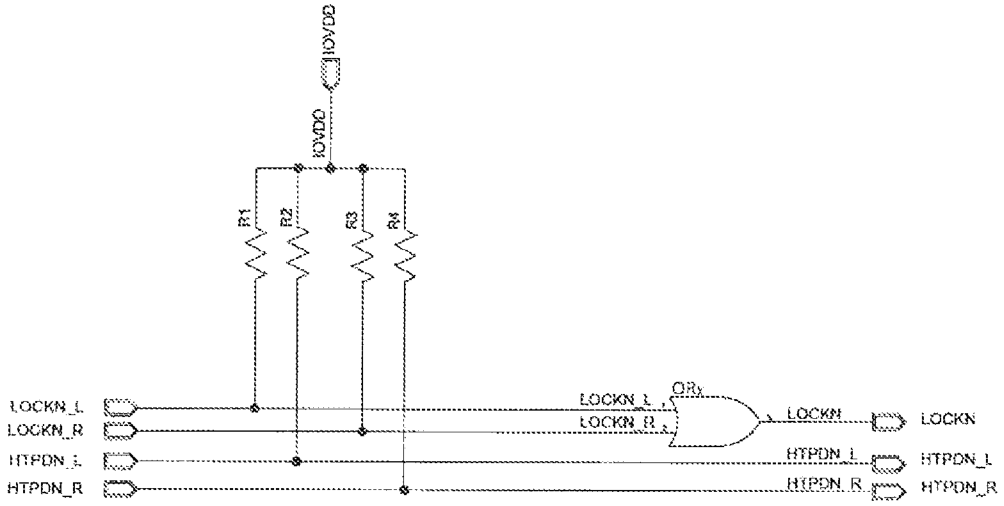
FIG. 3 is a schematic diagram illustrating a circuit structure of the data transmission device in FIG. 2.

FIG. 2 is a module diagram of a data transmission device comprising a multichannel V-By-One interface module according to one embodiment of the present invention, and FIG. 3 is a schematic diagram illustrating a circuit structure of the data transmission device in FIG. 2.

Referring to FIGS. 2 and 3, the data transmission device according to the embodiment mainly comprises a multichannel V-By-One interface module. According to one embodiment of the present invention, the multichannel V-By-One interface module may comprise a basic four-channel V-By-One interface unit. According to other embodiments of the present invention, the multichannel V-By-One interface module may comprise a multichannel V-By-One interface unit of other type, such as an eight-channel V-By-One interface unit, a sixteen-channel V-By-One interface unit, or the like.

The multichannel V-By-One interface module may comprise a receiving end RX, a transmitting end TX, and a buffer module arranged between the receiving end RX and the transmitting end TX. The receiving end RX transmits a plurality of control signals Lockn for a plurality of channels to the buffer module. The buffer module transmits one low-level control signal to the transmitting end TX when the received plurality of control signals Lockn are all at a low level. After receiving the low-level control signal, the transmitting end TX simultaneously transmits output data corresponding to the respective channels, which realizes time synchronization of all the output data, avoids abnormal display of images, enhances display quality of the images, and finally achieves the effect of optimizing and improving user experience.

According to V-By-One interface standard, the control signals Lockn are transferred between the receiving end RX and the transmitting end TX. The receiving end RX sets the control signals Lockn to a low level before getting ready to receive data. After the control signals Lockn are set to a low level, the transmitting end TX can be switched from a clock data recovery (CDR) training mode to a normal mode and starts transmitting data. Based on the V-By-One interface standard, the inventive concept is proposed, in which the buffer module is arranged between the receiving end RX and the transmitting end of the multichannel V-By-One interface module, and the receiving end RX sets the plurality of control signals Lockn for the plurality of channels to a low level before getting ready to receive data. The buffer module transmits one low-level control signal to the transmitting end TX when all the control signals Lockn input to the buffer module are at a low level.

Thus, the buffer module can be implemented by an OR-gate circuit. Input ends of the OR-gate circuit are connected with the receiving end RX of the multichannel V-By-One interface module, and an output end of the OR-gate circuit is connected with the transmitting end of the multichannel V-By-One interface module. The plurality of control signals Lockn for the plurality of channels transmitted from the receiving end RX are received at the input ends of the OR-gate circuit; and if one of the received control signals Lockn is at a high level, the control signal output from the output end of the OR-gate circuit is at a high level, and accordingly the transmitting end TX does not perform data transmission. Only when the plurality of control signals Lockn for the plurality of channels are all at a low level, does the output end of the OR-gate circuit output a low-level control signal, and accordingly the transmitting end TX cart simultaneously transmit output data corresponding to the channels after receiving the low-level control signal from the OR-gate circuit, ensuring synchronization of data transmission of the respective channels.

According to the embodiment, the buffer module is implemented as an OR-gate circuit. However, the present invention is not limited thereto. For the person skilled in the art, the buffer module can be implemented by adopting different gate circuits such as three NAND gates according to teaching of the present invention, as long as the gate circuit can achieve the function that one low-level signal is output if and only if all input signals are low-level signals.

Figure 4:
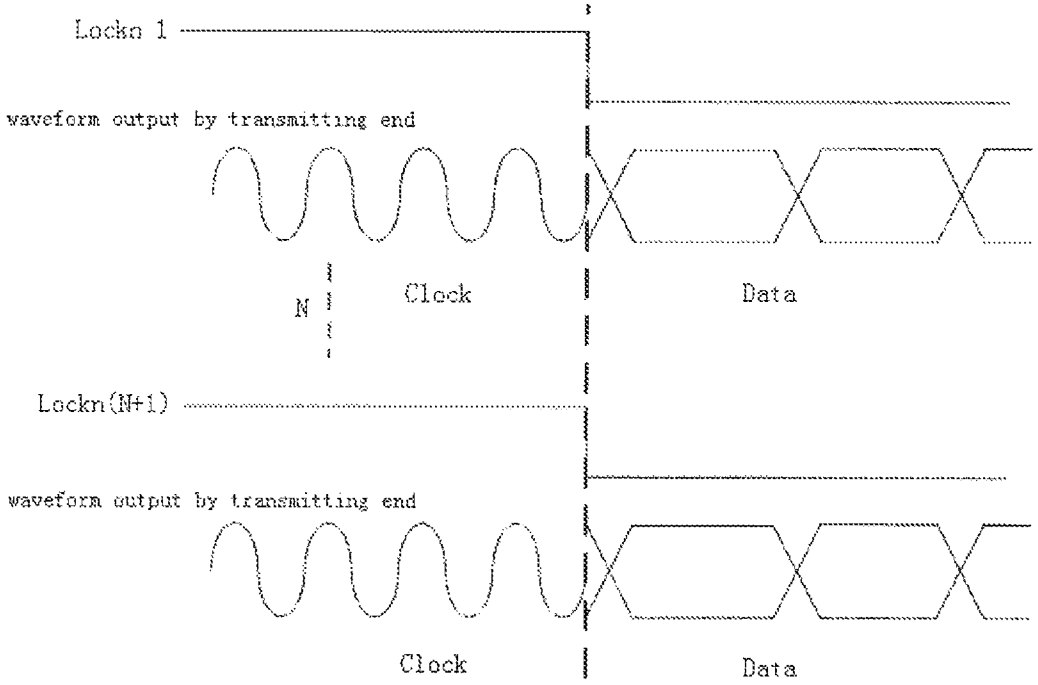
FIG. 4 is a schematic diagram illustrating control timing and output waveforms of the data transmission device in FIG. 2.

FIG. 4 is a schematic diagram illustrating control timing and output waveforms of the data transmission device in FIG. 2. It can be seen clearly that the delay between the output waveforms ΔT equals to 0, thus abnormal display of images is avoided, and display quality of images is enhanced.

Figure 5:
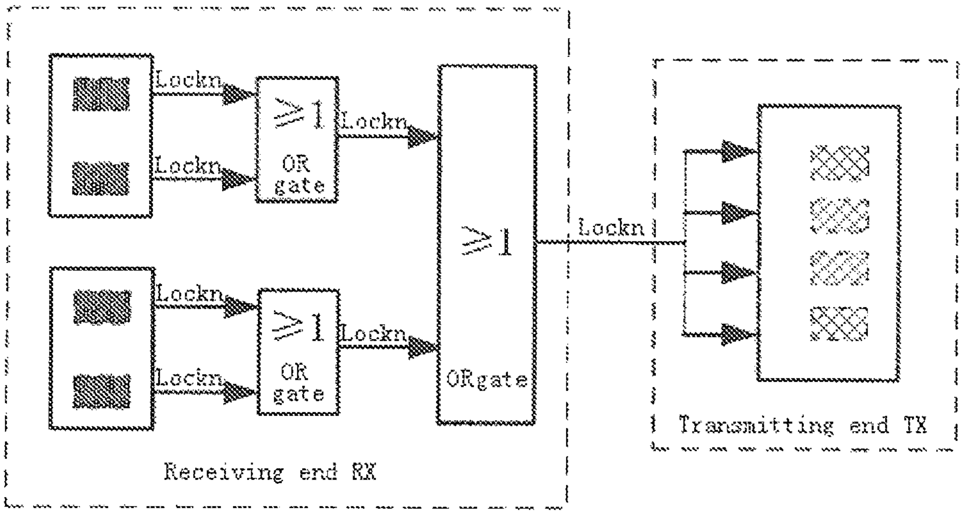
FIG. 5 is a module diagram of a data transmission device comprising a multichannel V-By-One interface module according to another embodiment of the present invention.

FIG. 5 is a module diagram of a data transmission device comprising a multichannel V-By-One interface module according to another embodiment of the present invention.

Referring to FIG. 5, the data transmission device according to the embodiment mainly comprises a multichannel V-By-One interface module. According to the embodiment, the multichannel V-By-One interface module may comprise a plurality of multichannel V-By-One interface units in parallel. Each multichannel V-By-One interface unit (e.g. a four-channel V-By-One interface unit) comprises a receiving end and a transmitting end. The receiving ends of the multichannel V-By-One interface units constitute a receiving end of the multichannel V-By-One interface module, and the transmitting ends of the multichannel V-By-One interface units constitute a transmitting end of the multichannel V-By-One interface module.

According to one embodiment of the present invention, the multichannel V-By-One interface units which are connected in parallel to form the multichannel V-By-One interface module can be four-channel V-By-One interface units. However, the present invention is not limited thereto. The multichannel V-By-One interface units which are connected in parallel to form the multichannel V-By-One interface module can be V-By-One interface units of other type, such as eight-channel V-By-One interface units or sixteen-channel V-By-One interface units. In addition, the multichannel V-By-One interface units which are connected in parallel to form the multichannel V-By-One interface module can be either the same as or different from one another. However, there will be a problem of unstable data transmission when too many multichannel V-By-One interface units are connected in parallel. The receiving ends of all the multichannel V-By-One interface units are connected to the buffer module. According to a preferred embodiment, the buffer module can be an OR-gate circuit. The structure and function of the buffer module are similar to those in the previous embodiment.

According to one embodiment of the present invention, the buffer module may comprise a plurality of buffer unit stages, and the number of buffer units in each buffer unit stage decreases progressively. The buffer units in the first buffer unit stage are connected with the receiving end of the multichannel V-By-One interface module, and there is one buffer unit in the last buffer unit stage, which is connected with the transmitting end of the multichannel V-By-One interface module. One or more buffer units in each buffer unit stage each transmit one low-level control signal to the buffer unit in the next buffer unit stage or to the transmitting end of the multichannel V-By-One interface module when all the control signals received by the buffer unit of the buffer unit stage are at a low level.

In actual operation, when all the control signals Lockn are input to the same OR-gate circuit, data transmission efficiency may be reduced, and hardware implementation may be inconvenient at the same time, since too many channels of control signals Lockn need to be processed simultaneously. Therefore, the buffer module comprising a plurality of buffer unit stages can effectively avoid such problems.

Referring to the embodiment shown in FIG. 5, the buffer module may comprise two buffer unit stages. The butter units in the first buffer unit stage are connected with the receiving end of the multichannel V-By-One interface module, and there is one buffer unit in the second buffer unit stage, which is connected with the transmitting end of the multichannel V-By-One interface module. The buffer units in the first buffer unit stage each transmit one low-level control signal to the one buffer unit in the second buffer unit stage respectively when all the control signals received by the buffer unit in the first unit stage are at a low level, and the one buffer unit in the second buffer unit stage transmits one low-level control signal to the transmitting end of the multichannel V-By-One interface module when all the control signals received by the one buffer unit in the second buffer unit stage are at a low level.

Time synchronization of all output data may also be achieved by using a plurality of buffer unit stages, so that abnormal display of images is avoided, and data transmission efficiency will not be reduced. However, buffer units in each stage may cause a certain degree of delay in operation, and thus in the multistage form, delays may accumulate, delay time is prolonged, and the probability of unstable data transmission is increased. The buffer units in the embodiment have the same function as the buffer module in the previous embodiment, and thus the buffer units are preferably OR-gate circuits.

The present invention also provides a data transmission method based on a multichannel V-By-One interface module, the multichannel V-By-One interface module comprising a receiving end, a transmitting end, and a buffer module arranged between the receiving end and the transmitting end. The method comprises the steps of: transmitting a plurality of control signals for a plurality of channels to the buffer module by the receiving end; transmitting one low-level control signal to the transmitting end by the buffer module when the received plurality of control signals are all at a low level; and starting transmitting data by the transmitting end after receiving the one low-level control signal. In this way, time synchronization of all output data can be achieved, abnormal display of images is avoided, and display quality of the images is enhanced.

The data transmission device according to the present invention can be applied to various display devices which can be any product or component with display function, such as a display panel, electronic paper, an organic light emitting diode (OLED) panel, a liquid crystal television, a liquid crystal display, a digital photo frame, a mobile phone, a tablet computer, or the like.

The above embodiments are only used for illustrating the present invention, instead of limiting the present invention, and various changes and variations can be made by the person skilled in the relevant art without departing from the spirit and scope of the present invention, and thus all equivalent technical solutions are also encompassed within the protection scope of the present invention.

The invention claimed is:

1. A data transmission device comprising a multichannel V-By-One interface module, the multichannel V-By-One interface module comprising:

a receiving end;

a transmitting end; and a buffer module arranged between the receiving end and the transmitting end, the receiving end transmits a plurality of control signals for a plurality of channels to the buffer module, the buffer module configured to transmit one low-level control signal to the transmitting end when the received plurality of control signals are all at a low level; and the transmitting end is configured to start transmitting data, corresponding to the plurality of channels, after receiving the one low-level control signal.

2. The data transmission device according to claim 1, wherein the multichannel V-By-One interface module comprises a plurality of multichannel V-By-One interface units in parallel, each of which comprises a receiving end and a transmitting end, the receiving ends of the multichannel V-By-One interface units constitute the receiving end of the multichannel V-By-One interface module, and the transmitting ends of the multichannel V-By-One interface units constitute the transmitting end of the multichannel V-By-One interface module.

3. The data transmission device according to claim 1, wherein the buffer module comprises one buffer unit.

4. The data transmission device according to claim 1, wherein the buffer module comprises a plurality of buffer unit stages, and a number of buffer units in each buffer unit stage decreases progressively, the buffer units in the first buffer unit stage are connected with the receiving end of the multichannel V-By-One interface module, one buffer unit is provided in the last buffer unit stage, which is connected with the transmitting end of the multichannel V-By-One interface module, wherein one or more buffer units in each buffer unit stage each transmit one low-level control signal to a buffer unit in the next buffer unit stage or to the transmitting end of the multichannel V-By-One interface module when all the control signals received by the buffer unit in the buffer unit stage are at a low level.

5. The data transmission device according to claim 4, wherein the buffer module comprises two buffer unit stages, the buffer units in the first buffer unit stage are connected with the receiving end of the multichannel V-By-One interface module, one buffer unit is provided in the second buffer unit stage, which is connected with the transmitting end of the multichannel V-By-One interface module, wherein the buffer units in the first buffer unit stage each transmit one low-level control signal to the one buffer unit in the second buffer unit stage respectively when all the control signals received by the buffer unit in the first buffer stage are at a low level, and the one buffer unit in the second buffer unit stage transmits one low-level control signal to the transmitting end of the multichannel V-By-One interface module when all the control signals received by the one buffer unit in the second buffer unit stage are at a low level.

6. The data transmission device according to claim 3, wherein the buffer unit comprises at least one logic gate circuit.

7. The data transmission device according to claim 2, wherein the multichannel V-By-One interface units are four-channel V-By-One interface units, and the receiving end of the multichannel V-By-One interface module transmits one control signal for four channels of each four-channel V-By-One interface unit.

8. A data transmission method based on a multichannel V-By-One interface module, the multichannel V-By-One interface module comprising a receiving end, a transmitting end, and a buffer module arranged between the receiving end and the transmitting end, the method comprising the steps of:

transmitting a plurality of control signals for a plurality of channels to the buffer module by the receiving end;

transmitting one low-level control signal to the transmitting end by the buffer module when the received plurality of control signals at the buffer module are all at a low level; and starting data transmission corresponding to the plurality of channels by the transmitting end after receiving the one low-level control signal.

9. A display device, comprising a data transmission device comprising a multichannel V-By-One interface module, the multichannel V-By-One interface module comprising:

a receiving end;

a transmitting end; and a buffer module arranged between the receiving end and the transmitting end, the receiving end transmits a plurality of control signals for a plurality of channels to the buffer module, the buffer module is configured to transmit one low-level control signal to the transmitting end when the received plurality of control signals at the buffer module are all at a low level; and the transmitting end is configured to start transmitting data corresponding to the plurality of channels after receiving the one low-level control signal.

10. The data transmission device according to claim 9, wherein the multichannel V-By-One interface module comprises a plurality of multichannel V-By-One interface units in parallel, each of which comprises a receiving end and a transmitting end, the receiving ends of the multichannel V-By-One interface units constitute the receiving end of the multichannel V-By-One interface module, and the transmitting ends of the multichannel V-By-One interface units constitute the transmitting end of the multichannel V-By-One interface module.

11. The data transmission device according to claim 9, wherein the buffer module comprises one buffer unit.

12. The data transmission device according to claim 9, wherein the buffer module comprises a plurality of buffer unit stages, and a number of buffer units in each buffer unit stage decreases progressively, the buffer units in the first buffer unit stage are connected with the receiving end of the multichannel V-By-One interface module, one buffer unit is provided in the last buffer unit stage, which is connected with the transmitting end of the multichannel V-By-One interface module, one or more buffer units in each buffer unit stage each transmit one low-level control signal to a buffer unit in the next buffer unit stage or to the transmitting end of the multichannel V-By-One interface module when all the control signals received by the buffer unit in the buffer unit stage are at a low level.

13. The data transmission device according to claim 12, wherein the buffer module comprises two buffer unit stages, the buffer units in the first buffer unit stage are connected with the receiving end of the multichannel V-By-One interface module, one buffer unit is provided in the second buffer unit stage, which is connected with the transmitting end of the multichannel V-By-One interface module, the buffer units in the first buffer unit stage each transmit one low-level control signal to the one buffer unit in the second buffer unit stage respectively when all the control signals received by the buffer unit in the first buffer stage are at a low level, and the one buffer unit in the second buffer unit stage transmits one low-level control signal to the transmitting end of the multichannel V-By-One interface module when all the control signals received by the one buffer unit in the second buffer unit stage are at a low level.

14. The data transmission device according to claim 11, wherein the buffer unit comprises at least one logic gate circuit.

15. The data transmission device according to claim 10, wherein the multichannel V-By-One interface units are four-channel V-By-One interface units, and the receiving end of the multichannel V-By-One interface module transmits one control signal for four channels of each four-channel V-By-One interface unit.

* * * * *